United States Patent
Chavali et al.

(10) Patent No.: US 10,489,332 B2
(45) Date of Patent: Nov. 26, 2019

(54) SYSTEM AND METHOD FOR PER-TASK MEMORY PROTECTION FOR A NON-PROGRAMMABLE BUS MASTER

(71) Applicant: TEXAS INSTRUMENTS INCORPORATED, Dallas, TX (US)

(72) Inventors: Balatripura Sodemma Chavali, Sugar Land, TX (US); Karl Friedrich Greb, Sugar Land, TX (US); Rajeev Suvarna, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 770 days.

(21) Appl. No.: 14/015,561

(22) Filed: Aug. 30, 2013

(65) Prior Publication Data
US 2014/0223047 A1    Aug. 7, 2014

Related U.S. Application Data

(60) Provisional application No. 61/762,212, filed on Feb. 7, 2013.

(51) Int. Cl.
| | |
|---|---|
| G06F 13/00 | (2006.01) |
| G06F 13/40 | (2006.01) |
| G06F 12/14 | (2006.01) |
| G06F 13/42 | (2006.01) |
| G06F 13/16 | (2006.01) |

(52) U.S. Cl.
CPC ...... *G06F 13/4068* (2013.01); *G06F 12/1416* (2013.01); *G06F 12/1458* (2013.01); *G06F 12/1483* (2013.01); *G06F 13/1605* (2013.01); *G06F 13/4221* (2013.01); *G06F 2212/1016* (2013.01); *G06F 2212/1052* (2013.01)

(58) Field of Classification Search
CPC ........ G06F 13/385; G06F 13/40; G06F 13/00; G06F 13/36; G06F 12/458; G06F 12/1483; G06F 13/1605; G06F 13/4221
USPC ................................ 710/104, 105, 305–306
See application file for complete search history.

(56) References Cited

U.S. PATENT DOCUMENTS

| | | | |
|---|---|---|---|
| 2008/0005513 A1* | 1/2008 | Lim | G06F 12/14 711/163 |
| 2009/0300324 A1* | 12/2009 | Inuo | G06F 9/461 712/17 |
| 2012/0023270 A1* | 1/2012 | Nadehara | G06F 9/468 710/22 |
| 2012/0216002 A1* | 8/2012 | Moyer | G06F 12/1416 711/163 |

* cited by examiner

*Primary Examiner* — Tim T Vo
*Assistant Examiner* — Kim T Huynh
(74) *Attorney, Agent, or Firm* — Ebby Abraham; Charles A. Brill; Frank D. Cimino

(57) ABSTRACT

A system includes a non-programmable bus master. The non-programmable bus master includes a memory protection unit (MPU) to operate in a first configuration with a first set of access permissions and a second configuration with a second set of access permissions, and hardware logic. The hardware logic executes a first task and a second task. The tasks generate transactions and the hardware logic switches between executing the first and second tasks. The hardware logic also causes the MPU to operate in the first configuration when the hardware logic executes the first task and causes the MPU to operate in the second configuration when the hardware logic executes the second task.

4 Claims, 2 Drawing Sheets

SYSTEM AND METHOD FOR PER-TASK MEMORY PROTECTION FOR A NON-PROGRAMMABLE BUS MASTER

CROSS-REFERENCE TO RELATED APPLICATION

The present application claims priority to U.S. Provisional Patent Application No. 61/762,212, filed on Feb. 7, 2013; which is hereby incorporated herein by reference.

BACKGROUND

Various processes are governed by international standards relating to safety and risk reduction. For example, IEC 61508 addresses functional safety of electrical, electronic, and programmable electronic devices, such as microcontrollers or other computers used to control industrial or other safety critical processes. IEC 61508 defines Safety Integrity Levels (SIL) based on a probabilistic analysis of a particular application. To achieve a given SIL, the application, including constituent components, must meet targets for the maximum probability of "dangerous failure" and a minimum "safe failure fraction." The concept of "dangerous failure" is defined on an application-specific basis, but is based on requirement constraints that are verified for their integrity during the development of the safety critical application. The "safe failure fraction" determines capability of the system to manage dangerous failures and compares the likelihood of safe and detected failures with the likelihood of dangerous, undetected failures. Ultimately, an electronic device's certification to a particular SIL requires that the electronic device provide a certain level of detection of and resilience to failures as well as enable the safety critical application to transition to a safe state after a failure.

Another functional safety standard is ISO 26262, which addresses the functional safety of road vehicles such as automobiles. ISO 26262 aims to address possible hazards caused by malfunctioning behavior of automotive electronic and electrical systems. Similar to SILs defined by IEC 61508, ISO 26262 provides an automotive-specific risk-based approach to determine risk classes referred to as Automotive Safety Integrity Levels (ASIL). ASILs are used to specify a particular product's ability to achieve acceptable safety goals.

An electronic device that controls a process—industrial, automotive, or otherwise—may be used to perform multiple functions, some of which are "safety functions" while others are "non-safety functions." A safety function is a function whose operation impacts the safety of the process; for example, a closed-loop control system that drives an electric motor used for power steering is a safety function. A non-safety function is a function whose operation does not impact the safety of the process; for example, debug functionality built into the electronic device that is used to develop software for the control functions, but is not used when the electronic device is integrated into a vehicle, is a non-safety function.

SUMMARY

The problems noted above are solved in large part by a system that includes a non-programmable bus master. The non-programmable bus master includes a memory protection unit (MPU) to operate in a first configuration with a first set of access permissions and a second configuration with a second set of access permissions, and hardware logic. The hardware logic executes a first task and a second task. The tasks generate transactions and the hardware logic switches between executing the first and second tasks. The hardware logic also causes the MPU to operate in the first configuration when the hardware logic executes the first task and causes the MPU to operate in the second configuration when the hardware logic executes the second task.

The problems noted above may be further solved by a method that includes executing a first task and switching from executing the first task to executing a second task, where the first and second tasks generate transactions. The method further includes causing a memory protection unit (MPU) to operate in a first configuration with a first set of access permissions when executing the first task and causing the MPU to operate in a second configuration with a second set of access permissions when executing the second task.

The problems noted above may be further solved by an electronic device to control a process, the electronic device including a bus slave being a memory or a peripheral and a programmable bus master to execute one or more tasks, each task to generate transactions directed at the bus slave. The electronic device also includes a non-programmable bus master having a memory protection unit (MPU) to operate in a first configuration with a first set of access permissions and a second configuration with a second set of access permissions and hardware logic. The hardware logic executes a first task and a second task, where the tasks generate transactions and where the hardware logic switches between executing the first and second tasks. The hardware logic also causes the MPU to operate in the first configuration when the hardware logic executes the first task and causes the MPU to operate in the second configuration when the hardware logic executes the second task. The electronic device also includes an interconnect to couple the bus slave to the programmable bus master and to the non-programmable bus master.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
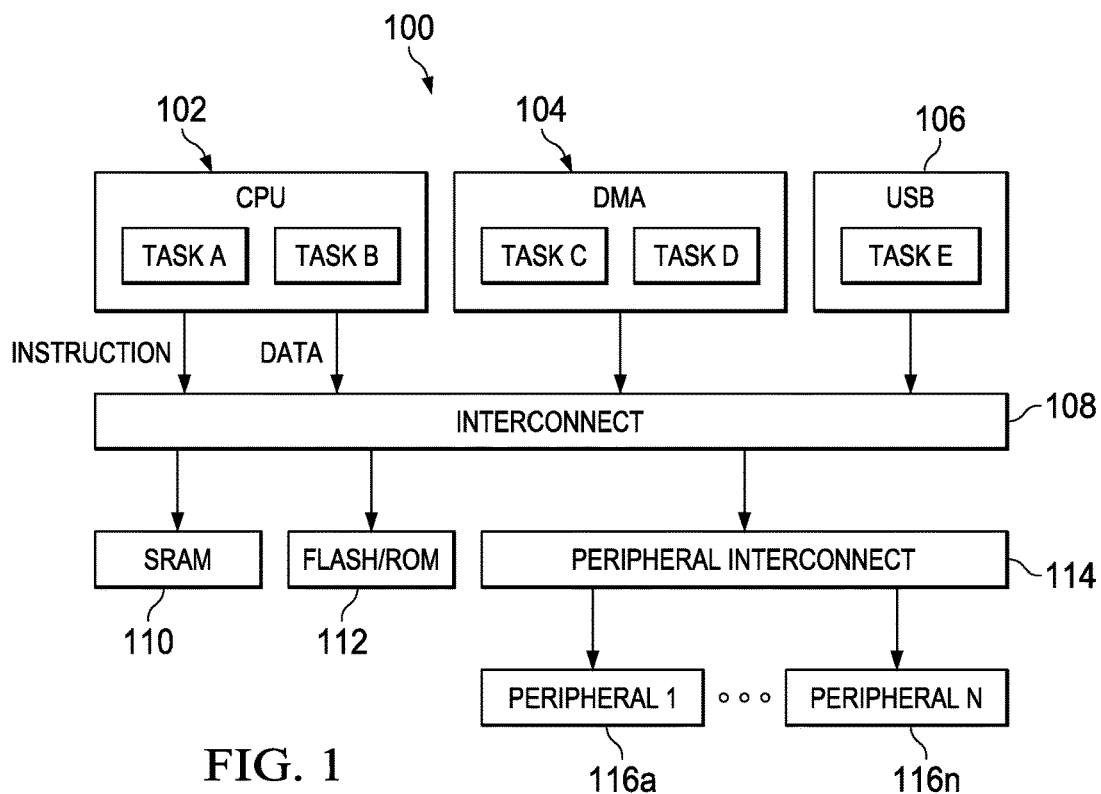
FIG. 1 shows a block diagram of an exemplary system on a chip (SOC) architecture in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

As used herein, the term "transaction" refers to a request to read from/write to memory or read from/write to another piece of logic or register.

As used herein, the term "bus master" refers to a piece of logic that initiates a transaction.

As used herein, the term "bus slave" refers to a component that receives a transaction; for example, a memory region or a peripheral may be a bus slave.

As used herein, the term "interconnect" refers to a component that distributes a transaction, for example between bus masters and bus slaves.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Safety and non-safety function may be implemented, for example, on a system on a chip (SOC) with one or more processor cores and a memory, which may be shared among processor cores. In theory, a highest level of safety is achieved when a separate SOC carries out each of the various functions of the electronic device. In this way, the operation of a particular function cannot be impaired or corrupted by other functions since a bus master that implements a particular function cannot access any bus slave(s) other than its own. However, such an approach is cost-prohibitive.

To reduce the cost of such electronic devices, safety functions may be implemented alongside non-safety functions, for example with multiple functions carried out by a single SOC. However, to maintain an appropriate SIL, certain functions should be prevented from interfering with other functions (e.g., a function should be prevented from accessing an address region memory that is not allocated to that function or by sending a transaction to a peripheral that is not allocated to that function).

Safety functions may be associated with one of a plurality of SILs. For example, a safety function with a SIL of 3 may require a high level of safety assurance while a function with a SIL of 2 or lower requires a lower level of safety assurance, while still requiring more safety assurance than a non-safety function. That is, the function with a SIL of 3 presents a greater degree of risk relative to the function with a SIL of 2 (or lesser) and as such requires greater risk reduction measures. As a result, multiple safety functions may have SILs that are independent of each other. Various standards require that functions having different SIL ratings should not interfere with one another. Similarly a non-safety critical task must not interfere with a safety critical task. Thus, while a non-safety function should be separated such that the non-safety function does not corrupt the safety function(s), a higher-SIL safety function (i.e., numerically greater) should also be separated such that the lower-SIL safety function does not corrupt the higher-SIL safety function.

FIG. 1 shows a system comprising SOC architecture 100 having multiple functions (also referred to as tasks) implemented by a number of bus masters. As explained above, the SOC architecture 100 may be part of an electronic device that controls a process and performs multiple functions. Certain of the functions or tasks may be safety functions, in some cases having varying SILs, and other of the tasks may be non-safety functions. The SOC architecture 100 comprises a CPU 102 implementing tasks A and B, a direct memory access (DMA) controller 104 implementing tasks C and D, and a Universal Serial Bus (USB) controller 106 implementing task E. The CPU 102, DMA controller 104, and USB controller 106 are examples of bus masters.

The SOC architecture 100 also comprises an interconnect 108 that couples the bus masters 102, 104, 106 to exemplary bus slaves, such as random access memory (RAM) 110 and read-only memory (ROM) 112. Additionally, the interconnect 108 may couple the bus masters 102, 104, 106 to peripherals 116a-116n (e.g., a serial port, a general purpose input/output port, or a timer). In some cases, a peripheral interconnect 114 is inserted between the interconnect 108 and the peripherals 116a-116n to further facilitate routing of transactions to the appropriate peripheral 116a-116n.

The SOC architecture 100 is exemplary, and it should be appreciated that multiple instances of various bus masters 102, 104, 106 may exist within an application-specific SOC. Regardless of the particular implementation, maintaining freedom from interference between various tasks at the bus slave level is important to assure that the device that carries out the various tasks achieves an acceptable level of risk. Additionally, as shown in FIG. 1, certain bus masters 102, 104, 106 implement multiple tasks, some of which may be safety functions and others of which may be non-safety functions, and so maintaining freedom of interference between tasks operating on a single bus master 102, 104, 106 is important as well. As will be explained in further detail below, in accordance with various embodiments the DMA controller 104 comprises hardware logic to reconfigure an associated MPU when the DMA controller 104 switches from executing a first task (e.g., task C) to a second task (e.g., task D).

Figure 2:
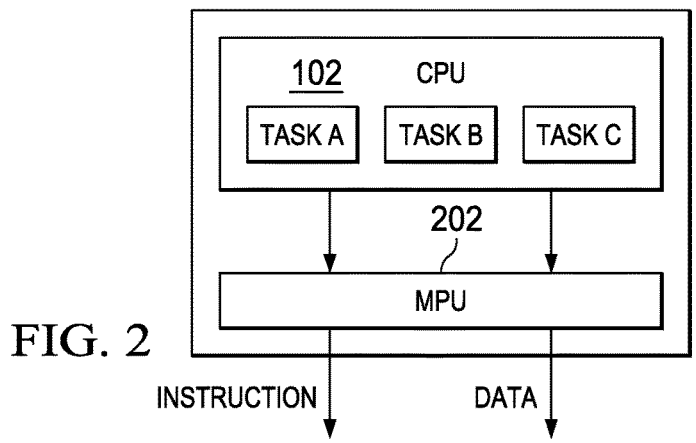
FIG. 2 shows a block diagram of an exemplary memory protection unit (MPU) in conjunction with a multiple-task bus master in accordance with various embodiments.

Turning to FIG. 2, the CPU 102 is shown with a local memory protection unit (MPU) 202. The MPU 202 comprises hardware logic (not shown) that determines whether to grant or deny access to a bus slave on a per transaction basis. The hardware logic may comprise various comparators, encoders, decoders and the like that utilize information contained in a transaction to determine whether to grant or deny access to a bus slave. For example, a transaction may be an instruction fetch or data access request. The MPU 202 may transmit an instruction fetch to an instruction bus, transmit a data access request to a data bus, or transmit either to a mixed instruction and data bus, along with a control signal to identify whether the transaction is an instruction fetch or a data access request. This is shown in FIG. 2 by way of the MPU 202 transmitting the instruction fetch and data access requests separately. The interconnect 108 is meant to represent the various bus implementations.

Information contained in the instruction fetch and/or data access request may be used to determine whether to grant or deny access to a bus slave. Additionally, the determination by the MPU 202 of whether to grant or deny access to a bus slave may be based on one or a combination of a number of factors.

In some cases, transactions may be isolated based on the address of memory to which the transaction is directed. For example, certain addresses may be protected while other addresses are non-protected. A transaction originating from a safety function may be granted access by the MPU 202 to an address that is either protected or non-protected, while a transaction originating from a non-safety function is granted access to an address that is non-protected and denied access to an address that is protected. Additionally, in certain embodiments there may be multiple levels of address protection and a higher-level safety function is permitted access to any address, while a lower-level safety function is only permitted access to certain levels of protected addresses and a non-safety function is only permitted access to non-protected addresses.

In other cases, transactions may be isolated based on a privilege level associated with the function or task that generates the transaction. For example, certain functions may be "privileged" and other functions may be "non-privileged." Transactions originating from a privileged function may be granted access by the MPU 202 to bus slaves that require a privileged level and transactions originating from a non-privileged function may be denied access to bus slaves that require a privileged level. Similarly, transactions may be isolated based on a security level where some functions comprise trusted code while other functions comprise non-trusted code. Transactions originating from trusted code are granted access by the MPU 202 to secure bus slaves and transactions originating from non-trusted code are denied access to secure bus slaves.

Additionally, transactions may be isolated based on a task identification (ID) associated with the function or task that generates the transaction. For example, the bus master or a CPU 102 may assign a task ID to each task that is running, which can be used by the MPU 202 to discriminate permissions on a per task basis. Alternately, transactions may be isolated based on whether the transaction originated from a function or task executed by a bus master that is a "functional unit" or executed by a bus master that is a "debug unit." The MPU 202 may grant access to certain bus slaves for tasks originating from a functional unit and deny access to those bus slaves for tasks originating from a debug unit.

Referring to FIGS. 1 and 2, address regions of the RAM 110 and/or ROM 112 have associated permissions. If various attributes of a particular function or task satisfy the permission level of the address region, the MPU 202 grants access to a transaction originating from that function or task. If the attributes do not satisfy the permission level of the address region, access is denied. For certain components that support the execution of more than one task (e.g., CPU 102), the associated MPU 202 is reconfigured when the task being executed changes to support task-based isolation. Configuration of the MPU 202 refers to the access permissions that are applied to the currently-executing task. For example, a memory buffer may belong to a first task. When the CPU 102 is executing the first task, the MPU 202 is configured to permit access to the memory buffer; however, when the CPU 102 switches to a second task, the MPU 202 is reconfigured to prevent access to the memory buffer. The MPU 202 may have many stored configurations corresponding to different tasks executed by the CPU 102. In some embodiments, the MPU 202 may switch configurations based on a different received task ID for a transaction. In other embodiments, such as where the bus master is the CPU 102, software executing on the CPU 102 that changes the task also reconfigures the MPU 202.

In the event of an attempted violation of access rules implemented by the MPU 202, various actions may be taken. For example, the MPU 202 may report the attempted access violation to a system-level monitoring task executing on the CPU 102. In some cases, the MPU 202 blocks the transaction from occurring, while in other cases the MPU 202 tags the transaction as having an error. Further, in security-sensitive applications where a transaction tagged as having an error may provide useful information to a malicious entity attempting to gain access to secure memory, a response may be generated that mimics a normal response, but which contains false data.

Figure 3:
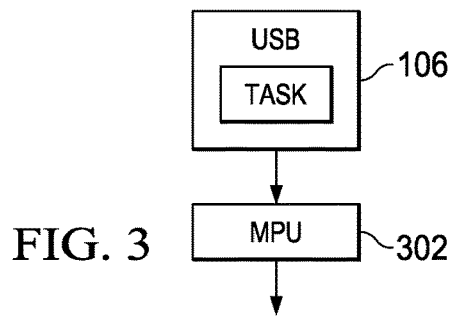
FIG. 3 shows a block diagram of an exemplary MPU in conjunction with a single-task bus master in accordance with various embodiments.

FIG. 3 shows the USB controller 106, which is an example of a single-task bus master. In the case of a single-task bus master, a MPU 302 similar to the MPU 202 is implemented, although on a simplified basis. For example, the USB controller 106 typically accesses only two regions—a transmit buffer and a receive buffer. Additionally, it is not necessary that the MPU 302 implement task-based discrimination since only one task is implemented by the USB controller 106.

In the above examples, a MPU 202, 302 facilitates protection of certain regions of memory and/or certain peripherals by limiting access by lower-level or non-safety functions where appropriate. As a result, an acceptable level of safety is achieved by the overall device on which the SOC architecture 100 is implemented while reducing the cost of the device by implementing many functions on a single SOC.

In accordance with various embodiments, a non-programmable bus master, such as the DMA controller 104, may implement multiple tasks to perform various functions. As used herein, the term non-programmable with respect to a device, such as a bus master, means that the device is externally configured to enable operation and does not have the capability to modify its configuration once the configuration is set, for example by external logic. In certain embodiments, a non-programmable device may execute software, while in other embodiments the non-programmable device does not execute software. However, unlike a bus master such as the CPU 102, which may reconfigure its MPU 202 with software executing tasks on the CPU 102, a non-programmable device such as the DMA controller 104 does not execute software capable of performing such a function so as to optimize its performance during DMA operations.

Figure 4:
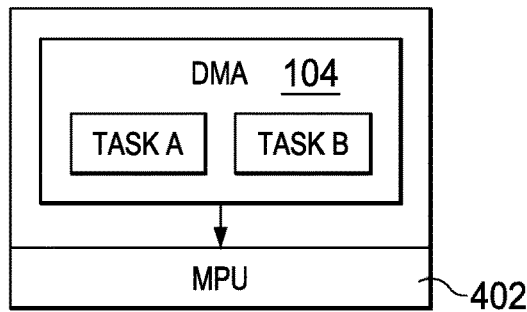
FIG. 4 shows a block diagram of an exemplary direct memory access (DMA) controller in conjunction with a multiple-task bus master in accordance with various embodiments.

Turning to FIG. 4, the DMA controller 104 comprises an integrated MPU 402. The DMA controller 104 is shown as able to implement multiple tasks, namely task C and task D. Each task generates various transactions to access memory 110, 112 or peripherals 116a-116n. In accordance with various embodiments, the DMA controller 104 includes hardware logic that switches between tasks as needed to perform the required functionality of the DMA controller 104. The MPU 402 is integrated to the DMA controller 104 such that, upon switching from one task to another, the DMA controller 104 causes a configuration of the MPU 402 to switch as well. For example, when the DMA controller 104 is executing task C, the DMA controller 104 causes the MPU 402 to operate in a first configuration, while when the DMA controller 104 is executing task D, the DMA controller 104 causes the MPU 402 to operate in a second configuration. As explained above, the MPU 402 regulates access to certain bus slaves in each configuration. The MPU 402 may have a different configuration for each task implemented by the DMA controller 104.

In some embodiments, the DMA controller 104 implements automated task-switching by automatically changing the configuration of the integrated MPU 402 when the DMA controller 104 switches tasks. However, in other embodiments, the DMA controller 104 may provide task identification (ID) to the MPU 402 and, as a result of receiving a different task ID, the MPU 402 changes its configuration. This allows the MPU 402 to be less closely integrated to the DMA controller 104. In still other embodiments, the DMA controller 104 may interrupt the CPU 102 upon switching tasks. In response to such an interrupt, software executing on the CPU 102 changes the configuration of the MPU 402.

As explained above, for a transaction generated by one of the tasks implemented by the DMA controller 104, the MPU 402 determines whether to grant or deny access to a bus slave for that transaction. This determination may be based on the address of memory to which the transaction is directed, a privilege level of the transaction or the task that generates the transaction, or a security level of the task that generates the transaction.

Thus, the DMA controller 104 enables automated task-switching for the MPU 402 configurations to apply different access permissions to each task executed by the DMA controller 104. As such, memory protection is enabled, achieving an acceptable level of risk, even in systems where a non-programmable bus master such as the DMA controller 104 implements multiple tasks, which include safety and non-safety functions.

Figure 5:
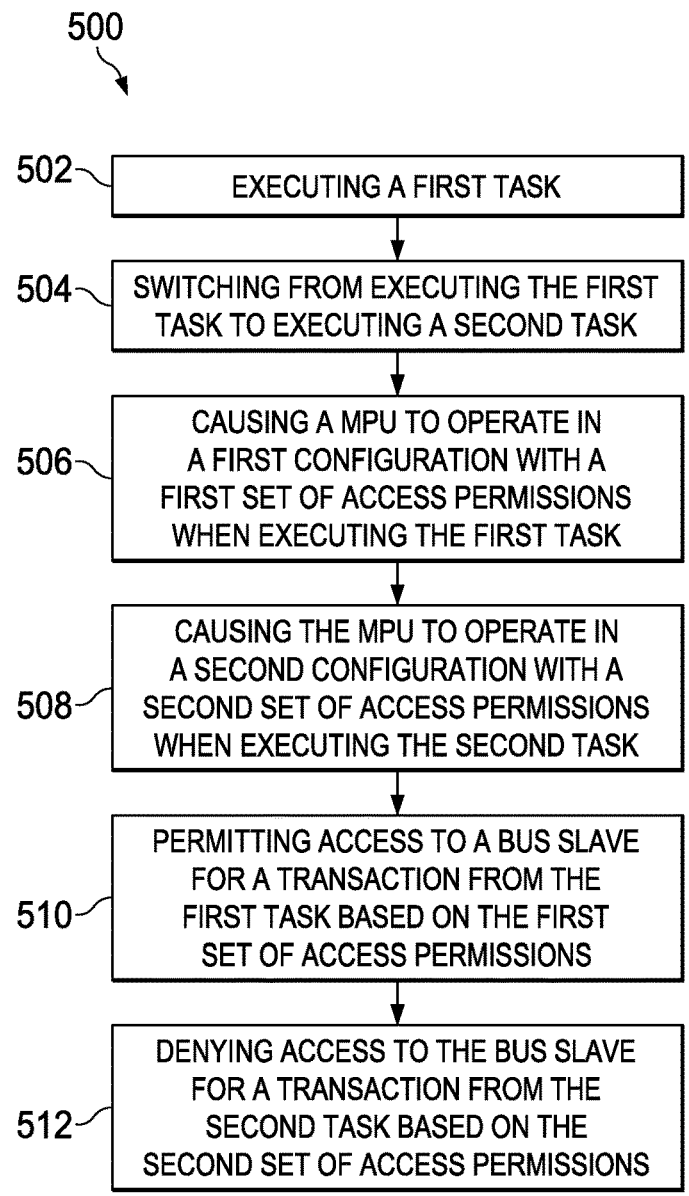
FIG. 5 shows a flow chart of a method in accordance with various embodiments.

FIG. 5 shows a method 500 for automated task-switching for a non-programmable bus master, such as the DMA controller 104, in accordance with various embodiments. The method 500 contains various steps, which may be performed in an order other than that shown in FIG. 5. The method 500 begins in block 502 with executing a first task. For example, the first task may be related to a safety function of varying levels or a non-safety function. As such, the first task may be granted access to particular bus slaves or restricted access to particular other bus slaves. The method 500 continues in block 504 with switching from executing the first task to executing a second task. Although non-programmable bus masters such as the DMA controller 104 do not typically implement software so as to optimize their performance for certain activities (e.g., DMA operations), these bus masters may implement more than one task and switch between such tasks.

The method 500 continues in block 506 with causing a MPU to operate in a first configuration with a first set of access permissions when executing the first task. The MPU regulates access to certain bus slaves in each configuration. The MPU may have a different configuration for each task implemented by the non-programmable bus master. Then, in block 508, the method 500 continues with causing the MPU to operate in a second configuration with a second set of access permissions when executing the second task. In some cases, the MPU is reconfigured by sending a task identification (ID) from the non-programmable bus master to the MPU. As a result of receiving a different task ID, the MPU may update its configuration to correspond to the task identified by the different task ID. In other cases, the non-programmable bus master may automatically change the configuration of the MPU upon a task switch without sending a task ID to the MPU. In this way, the MPU may be integrated with the non-programmable bus master to a varying degree while still enabling automated task-switching for the MPU, despite the non-programmable bus master not implementing software to manage the task-switching.

The method 500 then may continue in block 510 with permitting access to a bus slave for a transaction from the first task based on the first set of access permissions and in block 512 with denying access to the bus slave for a transaction from the second task based on the second set of access permissions. For example, the bus slave may comprise protected memory only accessible by a safety function, where the first task is a safety function and the second task is a non-safety function. Thus, the first set of access permissions allows transactions from the first task to access the protected memory while the second set of access permissions does not allow transactions from the second task to access the protected memory.

As a result, the method 500 enables automated task-switching for MPUs associated with non-programmable bus masters, such as the DMA controller 104. Different configurations of the MPU allow the MPU to apply different access permissions to each task executed by the non-programmable bus master. As such, memory protection is enabled, achieving an acceptable level of risk for electronic devices used to control various processes, even in systems where a non-programmable bus master such as the DMA controller 104 implements multiple tasks, which include safety and non-safety functions.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
 a non-programmable bus master, comprising:
  a memory protection unit (MPU) configured to operate in a first configuration with a first set of access permissions and a second configuration with a second set of access permissions, wherein:
   the MPU operating in the first configuration with the first set of access permissions is configured to permit a transaction to access a bus slave; and
   the MPU operating in the second configuration with the second set of access permissions is configured to:
    deny a transaction access to the bus slave; and
    communicate a response in response to denying the transaction access to the bus slave; and
  a direct memory access (DMA) controller configured to:
   execute a first task and a second task, wherein the first and second tasks are configured to generate transactions;
   cause the MPU to operate in the first configuration when the DMA controller executes the first task; and
   cause the MPU to operate in the second configuration when the DMA controller executes the second task.

2. The system of claim 1 wherein the DMA controller sends a task identification (ID) to the MPU and, upon receipt of a task ID, the MPU operates in one of the configurations based on the task ID.

3. The system of claim 1 wherein the DMA controller automatically changes the configuration of the MPU without sending a task identification (ID) to the MPU.

4. The system of claim 1 wherein the MPU is configured to permit or deny a transaction access to the bus slave based on one selected from the group consisting of:
- an address to which the transaction is directed;
- a privilege level associated with the task that generated the transaction;
- a security level associated with the task that generated the transaction; and
- whether the transaction was generated by a functional unit of the bus master or a debug unit of the bus master.

* * * * *